United States Patent
Keum et al.

(10) Patent No.: US 9,332,421 B2
(45) Date of Patent: May 3, 2016

(54) METHOD AND APPARATUS FOR RANDOM ACCESS TO MULTIMEDIA CONTENT IN WIRELESS COMMUNICATION SYSTEM

(75) Inventors: Ji Eun Keum, Suwon-si (KR); Sung Ryeul Rhyu, Yongin-si (KR); Seo Young Hwang, Suwon-si (KR); Jae Yeon Song, Seoul (KR)

(73) Assignee: Samsung Electronics Co., Ltd (KR)

( * ) Notice: Subject to any disclaimer, the term of this patent is extended or adjusted under 35 U.S.C. 154(b) by 260 days.

(21) Appl. No.: 13/805,569

(22) PCT Filed: Jun. 16, 2011

(86) PCT No.: PCT/KR2011/004411
§ 371 (c)(1),
(2), (4) Date: Dec. 19, 2012

(87) PCT Pub. No.: WO2011/162506
PCT Pub. Date: Dec. 29, 2011

(65) Prior Publication Data
US 2013/0132579 A1 May 23, 2013

(30) Foreign Application Priority Data
Jun. 23, 2010 (KR) .................. 10-2010-0059657

(51) Int. Cl.
*H04W 8/22* (2009.01)
*H04L 29/06* (2006.01)

(52) U.S. Cl.
CPC ........... *H04W 8/22* (2013.01); *H04L 29/06517* (2013.01); *H04L 29/06523* (2013.01)

(58) Field of Classification Search
CPC .................. H04L 29/06517; H04L 29/06523; H04W 8/22
See application file for complete search history.

(56) References Cited

U.S. PATENT DOCUMENTS

2006/0059245 A1 3/2006 Toma et al.
2011/0082946 A1* 4/2011 Gopalakrishnan .. H04L 65/4084
709/231

(Continued)

FOREIGN PATENT DOCUMENTS

KR 1020080018192 2/2008
KR 1020100028156 3/2010

OTHER PUBLICATIONS

3GPP Draft; S4-AHI176 Text Changes—Attachment, 3rd Generation Partnership Project (3GPP), XP-050437434, Feb. 23, 2010.*
R. Pantos, "HTTP Live Streaming", draft-pantos-http-live-streaming-04, Internet-Draft, XP-015068809, Jun. 6, 2010.

(Continued)

*Primary Examiner* — Brian J Gillis
*Assistant Examiner* — Gil H. Lee
(74) *Attorney, Agent, or Firm* — The Farrell Law Firm, P.C.

(57) ABSTRACT

A multimedia contents random access method for a wireless communication system is provided. The live content access method of a client in a wireless communication system according to the present invention includes receiving a request for playing a content, receiving content structure information on the content from a content transfer server, receiving content segments and random access informations of the content segments from a content provision server using the content structure information, and performing, when a random access request is received, random access to the content segments using the random access information. The content random access method of the present invention is capable of accessing the content in unit of content segment such that it is possible to access a past time point in the content even before all of the content segments are received completely.

10 Claims, 9 Drawing Sheets

(56) References Cited

U.S. PATENT DOCUMENTS

| | | | |
|---|---|---|---|
| 2011/0196982 A1* | 8/2011 | Chen et al. | 709/231 |
| 2011/0231569 A1* | 9/2011 | Luby et al. | 709/234 |
| 2011/0246659 A1* | 10/2011 | Bouazizi | 709/231 |
| 2011/0314174 A1* | 12/2011 | Joung et al. | 709/231 |

OTHER PUBLICATIONS

Qualcomm Europe S.A.R.L., "HTTP Streaming: Media Presentation Data Model", S4-090814, 3GPP TSG-SA4 #56, Nov. 9-13, 2009.

PCT/ISA/237 Written Opinion issued on PCT/KR2011/004411 (pp. 4).

PCT/ISA/210 Search Report issued on PCT/KR2011/004411 (pp. 3).

* cited by examiner

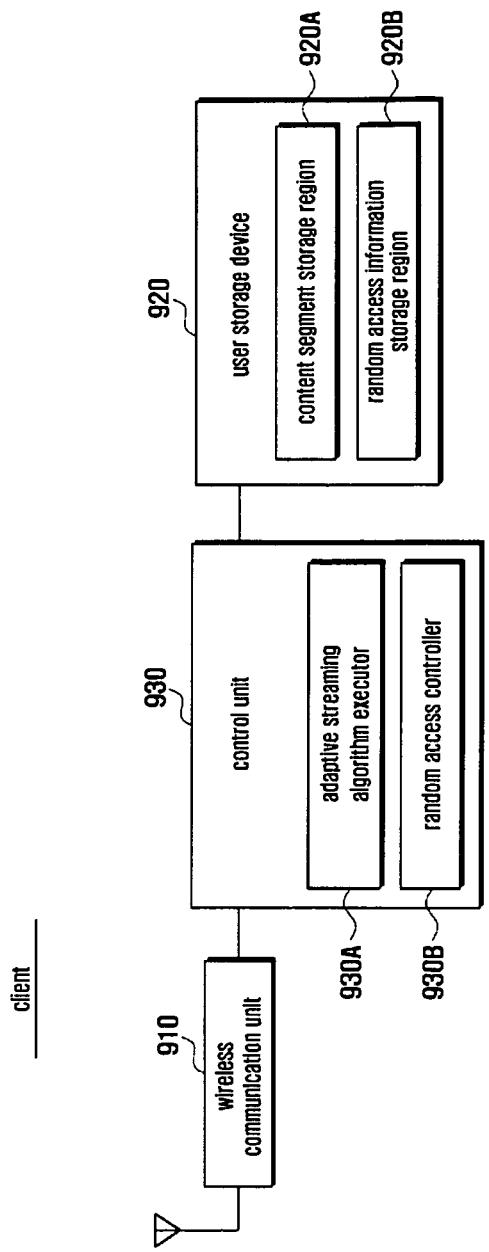

METHOD AND APPARATUS FOR RANDOM ACCESS TO MULTIMEDIA CONTENT IN WIRELESS COMMUNICATION SYSTEM

TECHNICAL FIELD

The present invention relates to a multimedia contents random access method for a wireless communication system. Particularly, the present invention relates to a content random access method and apparatus that allows accessing live content randomly in unit of segment, even before receiving the content composed of a plurality of content segments completely, using random access information generated per content segment.

BACKGROUND ART

With the increase of use of online contents, it is becoming important to transfer the content efficiently. Adaptive streaming is a streaming technology to transfer the content at a bit rate adjusted dynamically according to the change of available transmission bandwidth or device capacity.

The adaptive streaming selects one of multiple bit rates according to the condition of the user terminal and, transfers a multimedia content in unit of segment (content segment) based on Hyper-Text Transfer Protocol (HTTP) in order for the terminal to play the content seamlessly and is under discussion in many standardization organizations.

DISCLOSURE OF INVENTION

Technical Problem

According to the conventional technology, the user cannot access a certain time point of real-time streaming content broadcast in the format of MP2 before the corresponding content file has been received completely. This is because the information on the access points of the live content streaming is positions at the last of the MP4 file.

There is therefore a need of a method for accessing a certain time point of a streaming content randomly regardless of whether the content file has been downloaded completely.

Solution to Problem

In order to solve the problem of the prior art, the present invention provides a method and apparatus for random access to a multimedia contentment that allows a user to access a certain time point of a streaming content regardless of whether the content file has been downloaded completely.

In order to achieve the above objective, the present invention defines steps of storing, at a content provision server, random access information of each segment as a separate file, notifying, at a content transfer server, the client of a location of the file containing the random access information using MPD file with an element, storing, at the client, the random access informations of individual segments accumulatively, notifying of an appropriate content sample in response to a random access request of a user for the corresponding content in live broadcast, and attaching, when the transmission of the content file has completed, the random access information contained in an Mfra box to the end of the content file.

In accordance with an aspect of the present invention, a content random access method of a client in a wireless communication system includes receiving a request for playing a content, receiving content structure information on the content from a content transfer server, receiving content segments and random access informations of the content segments from a content provision server using the content structure information, and performing, when a random access request is received, random access to the content segments using the random access information.

In accordance with another aspect of the present invention, a content provision server for providing a client with live contents to in a wireless communication system includes a wireless communication unit which transmits and receives signal and data over a radio link established with the client and a control unit which divides a live content into a plurality of content segments, generates random access informations of individual content segments, and controls to transmit the content segments and the random access informations to the client in response to a request from the client.

In accordance with another aspect of the present invention, a content transfer server for providing a client with live content structure information in a wireless communication system includes a wireless communication unit which transmits and receives signals and data over a radio link established with the client and a control unit which generates a content structure information including location information of at least one content segment constituting a live content and location information of random access information of the at least one content segment and transmits the content structure information in response to a request from the client.

In accordance with another aspect of the present invention, a client for randomly accessing a live content in a wireless communication system includes a wireless communication unit which transmits and receives signals and data over a radio link established with one of a content transfer server and a content provision server, a control unit which receives a content structure information on the content in response to a content play request, receives content segments and random access information of the content segments from the content provision server using the content structure information, and controls to perform random access to the content segments using the random access information in response to a random access request, and a storage unit which stores the content segments and random access informations.

Preferably, the content structure information includes the location informations of the content segments constituting the content and location informations of the random access informations of the content segments. Preferably, the location informations of the content segments and the location informations of the random access informations of the content segments are contained separately from each other in the content structure information or the location informations of the content segments include the location information of the random access informations.

Advantageous Effects of Invention

According to the present invention, the client stores the random access information of the content segments constituting the content along with or separately from the content segments such that the user can access a certain time point of the live content randomly regardless of whether the content has been received completely.

BRIEF DESCRIPTION OF DRAWINGS

FIG. 9 is a block diagram illustrating a configuration of the client according to an embodiment of the present invention.

MODE FOR THE INVENTION

Although the description is directed to an exemplary case where the content segments are organized in the MP4 file format, the present invention is not limited thereto.

Exemplary embodiments of the present invention are described with reference to the accompanying drawings in detail. The same reference numbers are used throughout the drawings to refer to the same or like parts. Detailed description of well-known functions and structures incorporated herein may be omitted to avoid obscuring the subject matter of the present invention.

In the following, the description is made of representative embodiments of the present invention to accomplish the aforementioned technical solutions. Although the description is made using the terms of the objects defined in the communication standardization organization of 3GPP and IPTV standardization organizations of Open IPTV Forum (OIPF) and Motion Picture Expert Group (MPEG) for the simplicity purpose, the present invention is not limited to the standards and terms but can be applied to the other systems having the similar technical background.

Figure 1:
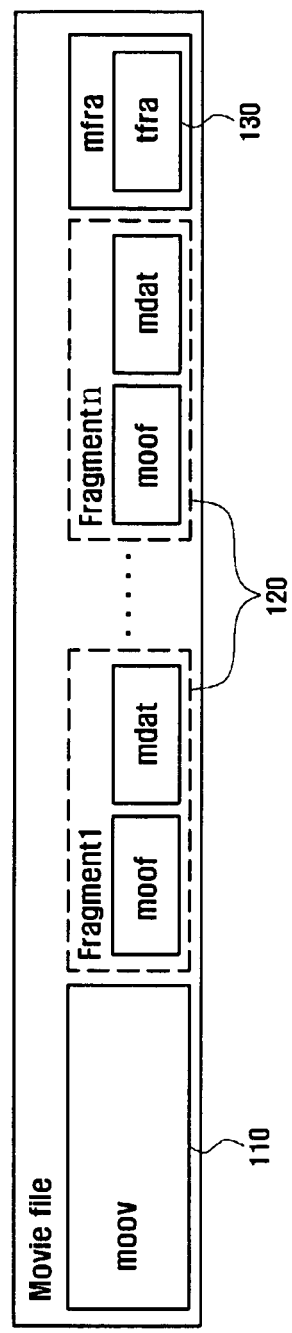
FIG. 1 is a diagram illustrating the conventional MP4 file format.

FIG. 1 is a diagram illustrating the conventional MP4 file format.

As shown in FIG. 1, the MP4 file format includes a movie metadata (moov) 110, a content fragment 120, and a movie fragment random access (mfra) box 130.

Each content fragment 120 is referred to as 'content segment' in the adaptive streaming technology and includes a header (moot) and a data (mdat). In following description of the embodiments of the present invention, the term 'content fragment' is used interchangeably with 'content segment'. According to the adaptive streaming mechanism of the present invention, the content is transferred to a client in the form of a plurality of content segments.

The movie fragment random access box 130 contains information on the Random Access Point (RAP) which the user can access freely. That is, the random access point includes the information on the key frame which can be played when a certain time point is selected. If the user selects a certain position, the key frame most adjacent to the selected position is played to start playback of the content from that position. In the following embodiments of the present invention, the movie fragment random access box 130 can be referred to as 'random access information'.

As shown in FIG. 1, the random access information is located at the last part of a content file. Accordingly, the user cannot access a certain position (particularly, past time point) of the content before receiving the random access information.

In order to solve this problem, the random access method of the present invention transmits the random access information per content segment to the client. Accordingly, the client can access a certain position in unit of content segment even though the entire content is not received completely.

First Embodiment

Figure 2:
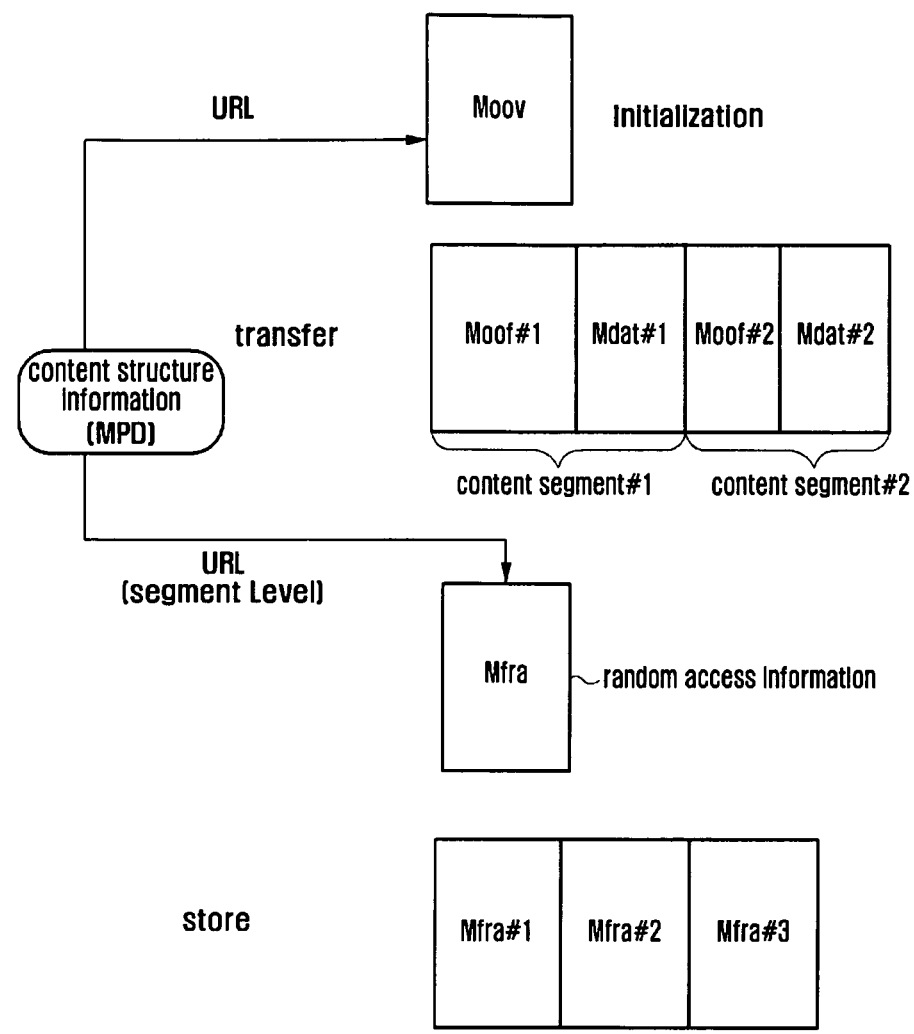
FIG. 2 is a diagram illustrating a principle of generating the random access information per content segment according to the first embodiment of the present invention.

FIG. 2 is a diagram illustrating a principle of generating the random access information per content segment according to the first embodiment of the present invention. In the first embodiment, the location information containing the random access information of each content segment is created and managed independently from the location information contained in the content segment (Moof, Mdat). That is, the location information of the content segment in the content structure information and the location information of the random access information per content segment are configured at independent segment levels. The content segment and the random access information can be stored independently from each other and thus have different location information (e.g., URL).

In order to acquire the content segment, the client should receive Media Presentation Description (MPD) file from the content transfer server. The MPD file contains the content structure information necessary for playing the corresponding content which includes at least one of content storage location information (e.g., URL), content broadcast time, number of content segments, duration of content segment, and bandwidth of each content segment. In the embodiment of the present invention, the term 'MPD file' is interchangeably used with the term 'content structure information'.

As shown in FIG. 2, the content structure information includes the information on the location of the moov box including initialization information of content segment and the information on the location of the content segments including Moof and Mdat. Also, the content structure information has to include the location information of the Mfra including the random access information of each content segment.

In other words, the content structure information according to the first embodiment of the present invention can include the location information of the random access information for each content segment in a field separately from the location information of the content segment. In this case, it is necessary to define an attribute for identifying the random access information field in the content structure information. This attribute is described in table 1.

TABLE 1

| Repre-sentation | E | 1...N | M | This element contains a description of a representation. |
|---|---|---|---|---|
| rapURL | A | | O | Gives the URL for indicating mfra file (Random Access information for MP4 file) for the segments in the representation. |

Referring to table 1 and FIG. 2, the content structure information includes the random access information corresponding to each content segment as a rapURL value varies. The client acquires the content segment and the random access information on the content segment from the corresponding location using the content structure information and stores the content segment and random access information separately. In this case, the client can store the random access information of the received content segments accumulatively.

Accordingly, even before the content is not received completely yet, the client can access a certain position to play the content therefrom, in response to a random access request of the user, using the random access information on the content segment.

Furthermore, when all of the content segments constituting the content are received completely, the client recovers the original content by placing the random access information at the last part of the content.

Figure 3:
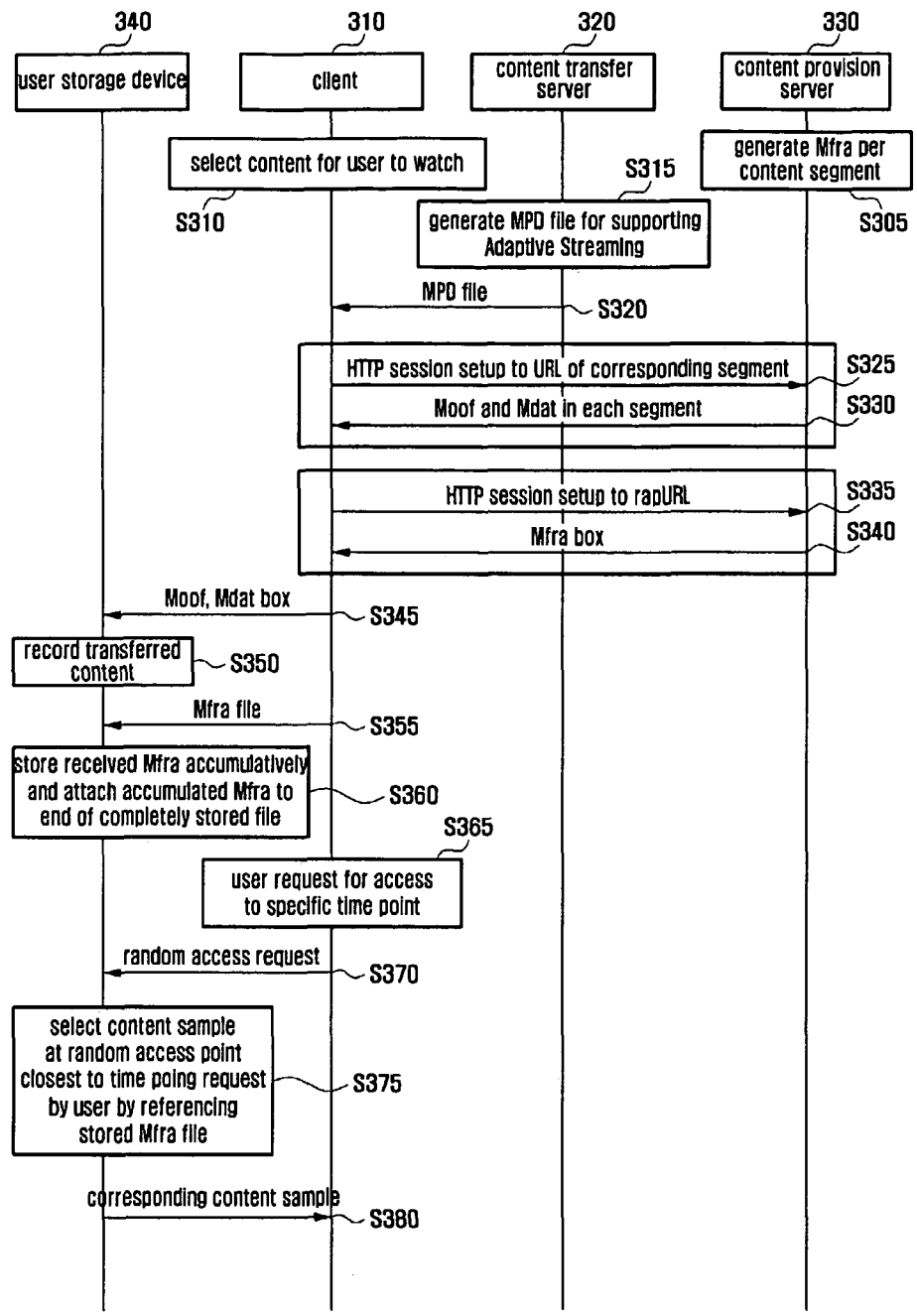
FIG. 3 is a signaling diagram illustrating a content random access method according to the first embodiment of the present invention.

FIG. 3 is a signaling diagram illustrating a content random access method according to the first embodiment of the present invention.

As shown in FIG. 3, the content random access system according to an embodiment of the present invention includes a client 310, a content transfer server 320, a content provision server 330, and a user storage device 340. Although the client 310 and the user storage device 340 are depicted separately in FIG. 3, this does not mean that the client 310 and the user storage device 340 are physically separated. The client 310 can integrate the user storage device 340, and this principle can be commonly applied to all embodiments described hereinafter.

First, the content provision server 330 generates the random access information of one or more content segments constituting the content (S305). Unlike the conventional method which generates the random access information for the entire content, in the content random access method according to an embodiment of the present invention, the content provision server 330 generates the random access informations of individual content segments for supporting random access in unit of content segment.

The client 310 receives a command input by the user for selecting a content to play (S310). Next, the content transfer server 320 generates the content structure information for supporting the adaptive streaming (S315). The content structure information can include the location information of the random access information for each content segment. In this case, the content structure information according to the first embodiment can be configured such that the location information of the content segment and the location information of the random access information are independent from each other, and a new field for identifying the location information of the random access information can be defined as shown in table 1.

Next, the client 310 receives the content structure information transmitted by the content transfer server 320 (S320). Upon receipt of the content structure information, the client 310 selects the content segment suitable according to the physical statue of the client 310 or bandwidth status of the network as live broadcast playback time progresses by referencing the received content structure information. The client establishes a session (HTTP session in the embodiments of the present invention) with the content provision server 330 using the URL where the selected content segment is stored (S325). Next, the client 310 receives the header (moot) and data (mdat) in transmitted in each content segment (S330).

Simultaneously with the receipt of the content segment, the client 310 has to receive the random access information of each content segment from the content provision server 330. For this purpose, the client 310 establishes an HTTP session with the content provision server 330 using the value contained in the rapURL attribute (S335) and receives the random access information of each content segment (S340).

Next, the client 310 transfers the header (moot) and data (mdat) constituting the content segment to the user storage device 340 (S345), and the user storage device 340 stores (records) the content segment (S350). The client 310 also transfers the random access information of each content segment to the user storage device 340 (S355). The user storage device 340 stores the random access information accumulatively in sequence (S360).

Once all of the content segments constituting the content and random access information corresponding to the content segments have been received, the user storage device 340 attaches the random access information to the end of the content file to generate the original content file. The user storage device 340 also can make a link to the location where the random access information has been stored rather than attaching the random access information to the content file.

According to the above described embodiment of the present invention, it is possible to perform random access in unit of content segment even though all of the content segments are not received yet. For this, when a request for accessing a specific time point of the content is received at step S365, the client 310 requests the user storage device 340 for random access (S370). Upon receipt of the request, the user storage device 340 selects the content sample corresponding to the random access point most adjacent to the time point that the user has requested, using the random access information (S375). Finally, the user storage device 340 transfers the selected content sample to the client 310 to play the content from the corresponding time point (S380).

Second Embodiment

Figure 4:
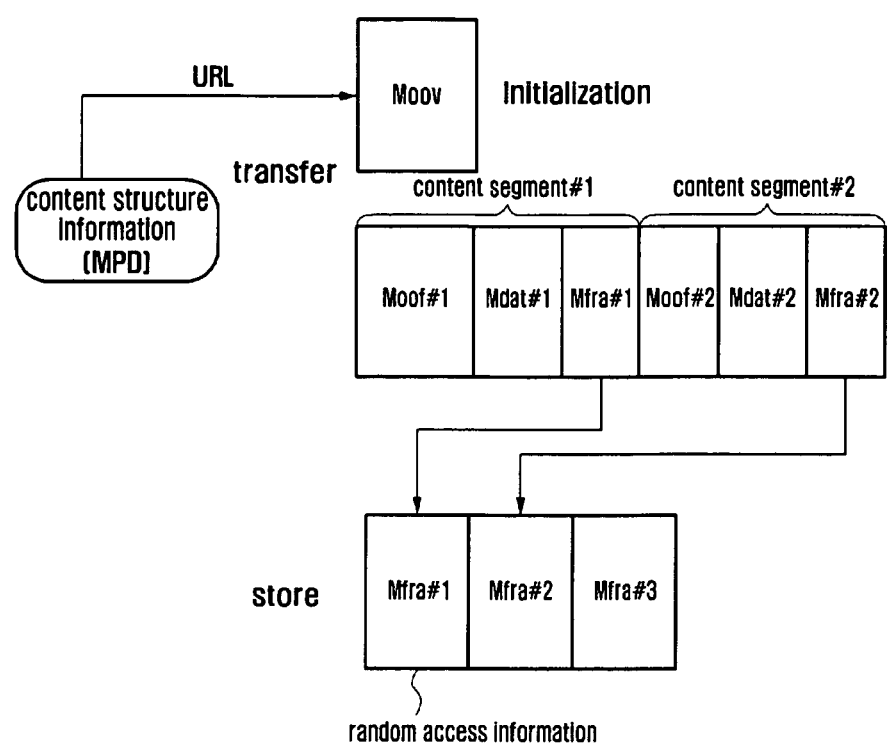
FIG. 4 is a diagram illustrating a principle of generating the random access information per content segment according to the second embodiment of the present invention.

FIG. 4 is a diagram illustrating a principle of generating the random access information per content segment according to the second embodiment of the present invention. In the second embodiment, the location information of the random access information for each segment is transmitted to the client in the content segment location information. Unlike the first embodiment, there is no need to define a new field for interpreting the location information of the random access information.

As shown in FIG. 4, the content structure information can include the address of the moov box containing the initialization information of the content segment, the addresses of the content segments, and the random access information of the individual segments.

The client extracts the random access information using the address of the random access information from the content structure information and stores the random access information as a separate file.

Figure 5:
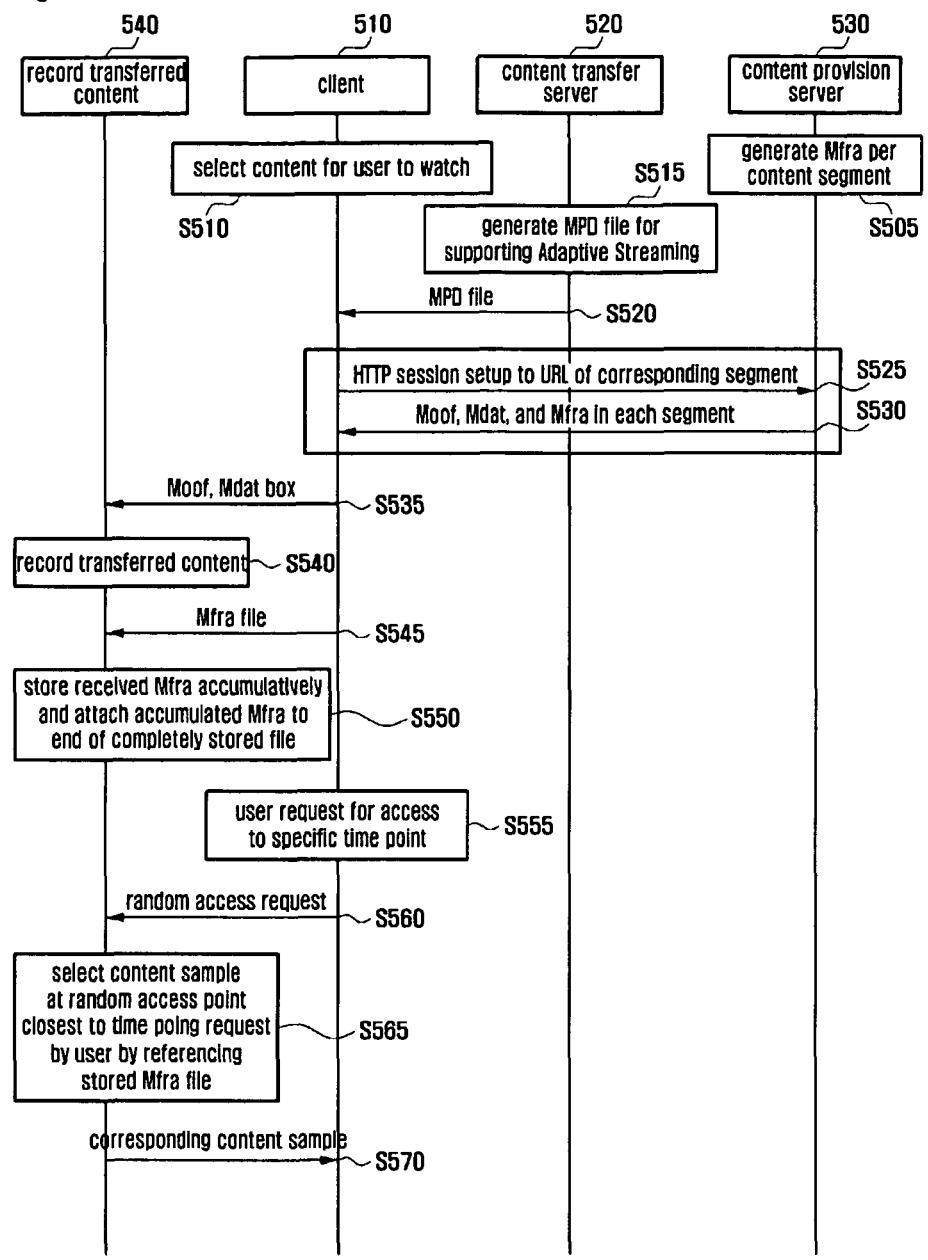
FIG. 5 is a signaling diagram illustrating a content random access method according to the second embodiment of the present invention.

FIG. 5 is a signaling diagram illustrating a content random access method according to the second embodiment of the present invention.

First, the content provision server 530 generates random access information of one or more content segments constituting the content (S505). In the present invention, in order to perform random access in unit of content segment, the contention provider server 530 generates the random access information per content segment.

The client 510 receives the command input by the user to select content (S510). Next, the content transfer server 520 generates the content structure information for supporting the adaptive streaming (S515). The content structure information can include the location information of the random access information for each content segment. The content structure information according to the second embodiment can include the location information of the random access information which belongs to the location information of the content segment and, there is no need to define a new field for identifying the location information of the random access information unlike the first embodiment.

The client 510 receives the content structure information transmitted by the content transfer server 520 (S520). The client 510 refers to the content structure information to select an appropriate content segment according to the physical condition of the client 510 or the bandwidth condition of the network. Next, the client 510 establishes an HTTP session with the content provision server 530 to the URL of the selected content segment (S525). Next, the client 510 receives the header (moof), data (mdat) and random access information of each content segment (S530).

The client 510 transfers the header (moot) and data (mdat) of the content segment to the user storage device 540 (S535), and the user storage device 540 stores (records) the header (moot) and data (mdat) (S540). Next, the client 510 transfers the random access information of each content segment to the user storage device 540 (S545). Next, the user storage device 540 stores the random access information accumulatively in sequence (S550).

Once all of the content segments constituting the content and the random access information of the content segments have been received, the user storage device 540 attaches the random access information to the end so as to recover the original content file. The user storage device 540 also can make a link to the location where the random access information is stored rather than attach the random access information to the content file.

According to the above described embodiment of the present invention, it is possible to perform random access in unit of content segment even though all of the content segments are not received yet. For this, when a request for accessing a specific time point of the content is received at step (S555), the client 510 requests the user storage device 340 for random access (S560). Upon receipt of the request, the user storage device 540 selects the content sample corresponding to the random access point most adjacent to the time point that the user has requested, using the random access information (S565). Finally the user storage device 540 transfers the selected content sample to the client 510 to play the content from the corresponding time point (S570).

Third Embodiment

Figure 6:
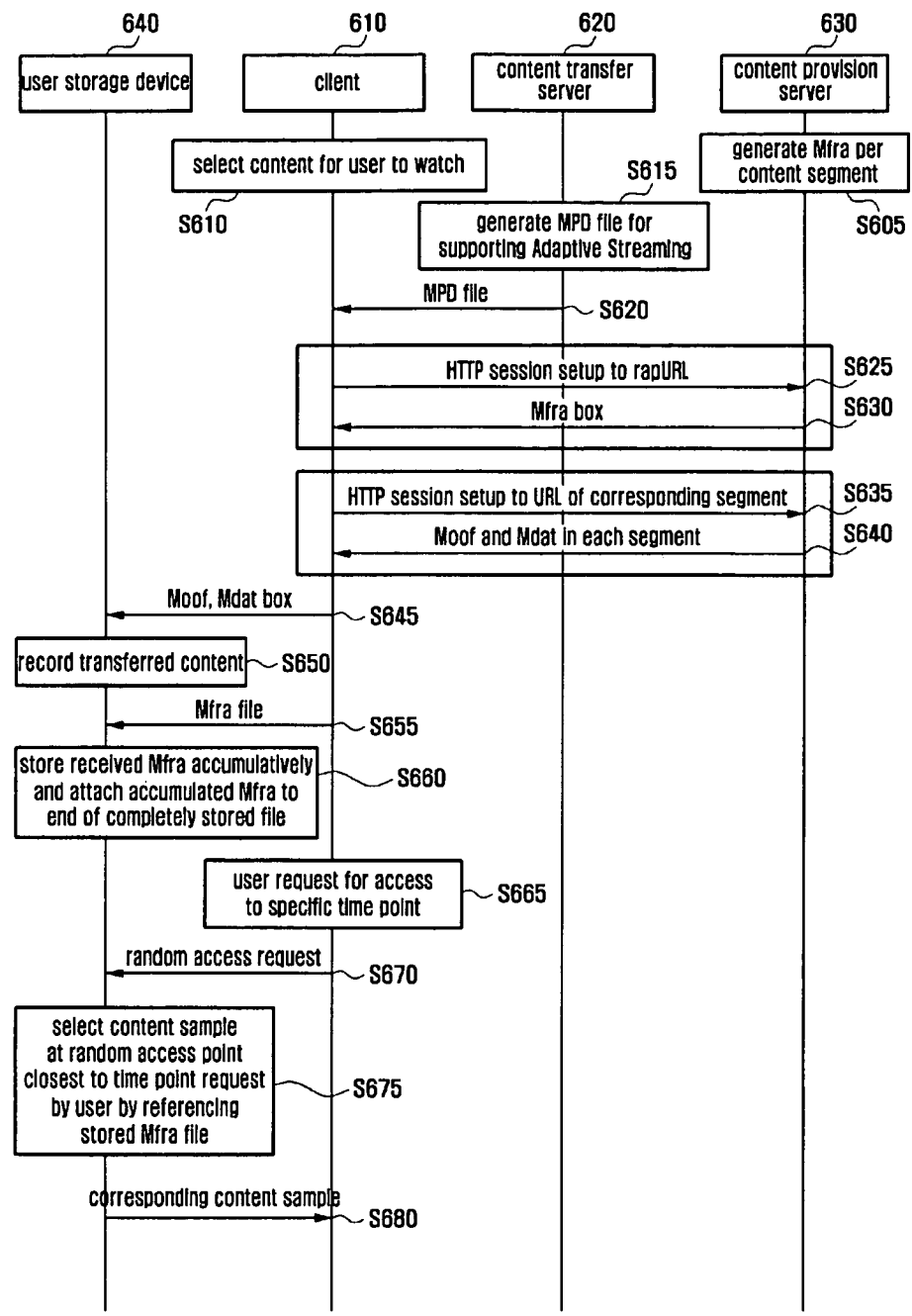
FIG. 6 is a signaling diagram illustrating a content random access method according to the third embodiment of the present invention.

FIG. 6 is a signaling diagram illustrating a content random access method according to the third embodiment of the present invention.

The content random access method according to the third embodiment is similar to that of the first embodiment except that some steps (i.e., S625 to S640) are changed in execution order.

In the first embodiment, the client 310 receives the header (moot) and data (mdat) information of the content segment (S325 and S330) and then the random access information of each content segment (S335 and S340).

In contrast, the client 610 according to the third embodiment receives the random access information first (S625 and S630) and then the header (moot) and data (mdat) information of the content segment using the content structure information and random access information (S635 and S640).

Since the other steps of the third embodiment are identical with those of the first embodiment, detailed description thereof is omitted herein.

Figure 7:
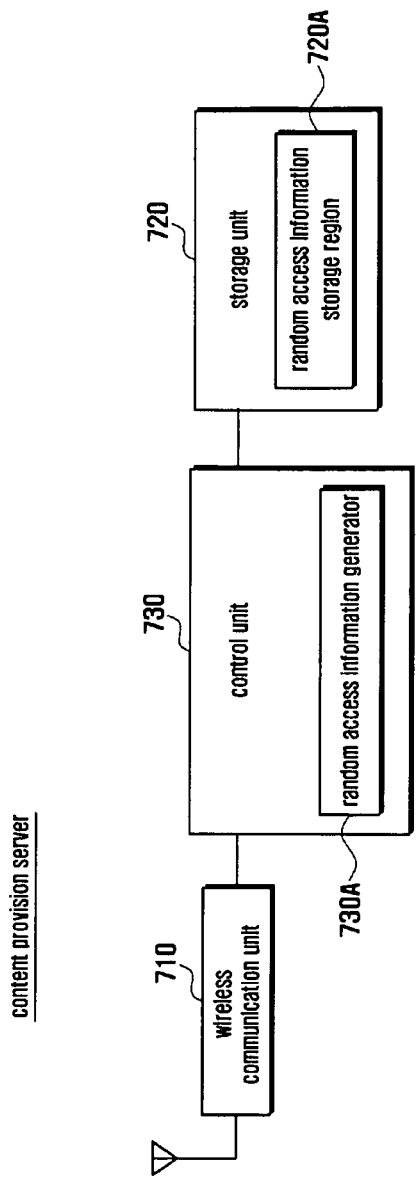
FIG. 7 is a block diagram illustrating a configuration of the content provision server according to an embodiment of the present invention.

FIG. 7 is a block diagram illustrating a configuration of the content provision server according to an embodiment of the present invention. As shown in FIG. 7, the content provision server includes a wireless communication unit 710, a storage unit 720, and a control unit 730.

The wireless communication unit 710 establishes a radio channel with the client 310 (or 510) for communicating signals. Particularly, the wireless communication unit 710 establishes an HTTP session with the client and transmits the content segments and the random access informations of the content segments stored in the content provision server to the client.

The storage unit 720 can store the programs necessary for the content provision server to operate according to an embodiment of the present invention. The storage unit 720 also can store one or more content segments constituting certain content.

Particularly, the storage unit 720 according to an embodiment of the present invention can include a random access information storage region 720A. The random access information storage region 720A can store the random access informations of the individual content segments in the form of Mfra box.

The control unit 730 controls overall operations of the content provision server 330 (530). That is, the control unit 730 establishes an HTTP session with the client 310 (510) and controls processes for transmitting/receiving corresponding content file and/or control signal. The control unit 730 also can control the process related to the transmission of the random access information to the client.

Particularly, the control unit 730 according to an embodiment of the present invention can include a random access information generator 730A. The random access information generator 730A controls to generate random access information of one or more content segments constituting the content. Unlike the conventional method in which the random access information is generated for the whole content file, the content random access method according to an embodiment of the present invention generates the random access informations for individual content segments constituting a content file. Accordingly, it is possible to access randomly in unit of content segment even before receiving the content file completely.

Figure 8:
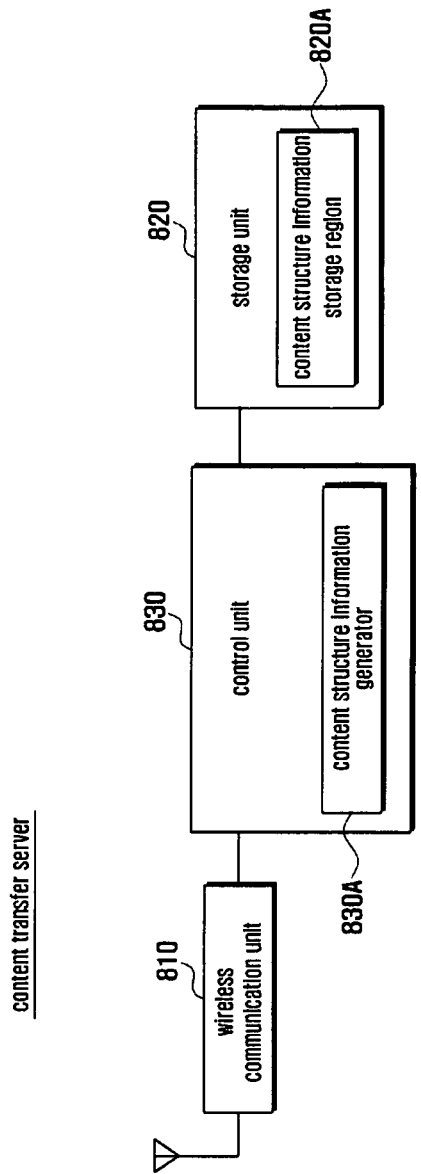
FIG. 8 is a block diagram illustrating a configuration of the content transfer server according to an embodiment of the present invention.

FIG. 8 is a block diagram illustrating a configuration of the content transfer server according to an embodiment of the present invention. As shown in FIG. 8, the content transfer server includes a wireless communication unit 810, a storage unit 820, and a control unit 830.

The wireless communication unit 810 establishes a radio link with the client 310 to communication signals. Particularly, the wireless communication unit 810 transmits the content structure information (MPD) to the client for supporting the adaptive streaming mechanism.

The storage unit 820 can store the programs necessary for the content transfer server 320 (520) to operate according to an embodiment of the present invention.

Particularly, the storage unit 820 according to an embodiment of the present invention can include a content structure information storage region 820A. The content structure information storage region 820A can store the content structure information to be delivered to the client temporarily.

The control unit 830 controls overall operations of the content transfer server 320 (520). That is, the control unit 830 controls the process related to transmission of the content structure information generated according to the adaptive streaming mechanism to the client.

Particularly, the control unit 830 according to an embodiment of the present invention can include a content structure information generator 830A for generating the content structure information for supporting the adaptive streaming. The content structure information generator 830A can operate differently in the first embodiment (or third embodiment) and the second embodiment.

According to the first embodiment, the content structure information generator 830A generates the content structure information including location information of the moov box containing initialization information of the content segments and the location information of the random access informations of the individual content segments. In this case, the location information of the content segments and the location information of the random access information generated separately from each other.

According to the second embodiment, the content structure information generator 830A generates the content structure information including the location information of the moov box containing the initialization information of the content segments, the location information of the content segments including Moof and Mdat, and the location information of the random access information of individual content segments. Here, the location information of the random access information is included in the location information of the content segments.

The content structure information generator 830A can control to store the content structure information generated according to the above-described procedure in the content structure information storage region (820A).

FIG. 9 is a block diagram illustrating a configuration of the client according to an embodiment of the present invention. As shown in FIG. 9, the client according to an embodiment of the present invention includes a wireless communication unit 910, a storage unit 920, and a control unit 930.

The wireless communication unit 910 connects to the content transfer server 320 (520) or the content provision server 330 (530) to communicate signals. Particularly, the wireless communication unit 910 can receive the content structure information transmitted by the content transfer server. The wireless communication unit 910 also can establish an HTTP session to receive the content segments and random access information of individual content segments.

The user storage unit 920 can store the programs necessary for the client 310 (510) to operate according to an embodiment of the present invention. Particularly, the user storage unit 920 can include a content segment storage unit 920A for storing the content segments received from the content provision server and a random access information storage region 920B for storing the random access informations of the individual content segments.

Although the client and the user storage device are depicted separately in FIGS. 3 and 5, the client can incorporate the user storage device as shown in FIG. 9 and such a modification can be made in the range predictable by those skilled in the art.

The control unit 930 controls overall operations of the client 310. In response to the user request for content playback, the control unit 930 receives the content structure information from the content transfer server and controls the procedure for storing the content segments and random access informations received from the content provision server.

According to the first embodiment (or the third embodiment), the control unit 930 can identify the location information of the random access information transmitted by the content provision server using the attribute defined newly as shown in table 1. In contrast, according to the second embodiment of the present invention, the location information of the random access information is included in the location information of the content segment such that the control unit 930 can identify the location information of the random access information with the attribute which is newly defined in the first embodiment.

In case that all of the content segments constituting content have been received completely, the control unit 930 can control to attach the random access information to the end of the content to recover the original content file. According to another embodiment of the present invention, the control unit 930 can make a link to the location of the random access information rather than attach the random access information to the content file.

According to an embodiment of the present invention, the control unit 930 can include an adaptive streaming algorithm executor 930 and a random access controller 930B.

When the content segments are received, the adaptive streaming algorithm executor 930A selects one of multiple bit rates appropriate for the status of the network and client and receives the content segments at the selected bit rate. The adaptive streaming algorithm executor 930A can execute an algorithm to select the optimal bit rate in consideration of the content structure information received from the content transfer server, the radio network environment, and the client environment. The adaptive streaming algorithm executor 930A also can control to receive the content segments at the selected bit rate.

The random access controller 930B controls to play the content sample corresponding to a random access point nearest to the position requested by the user using the random access information in response to the random access request of the user. In this case, since the random access information is generated per content segment, the random access controller 930B can perform random access in unit of content segment.

Although the control unit of each component is divided into sub-function blocks in FIGS. 7 to 9, the control unit is not limited to such configurations but can execution the functions by itself.

According to the present invention, the client stores the random access information of the content segments constituting the content along with or separately from the content segments such that the user can access a certain time point of the live content randomly regardless of whether the content has been received completely.

As described above, the client of the present invention stores the random access information of the content segments constituting the content along with or separately from the content segments. Accordingly, the user can access a certain time point of the live content of MP4 format, which is transmitted in adaptive streaming mechanism, regardless of whether the content has been received completely.

Although exemplary embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

The invention claimed is:
1. A live content access method of a client in a wireless communication system, comprising:
 receiving a request for playing a content;
 receiving content structure information on the content from a content transfer server;
 receiving content segments and random access information of the content segments from a content provision server using location information of the content seg- ments and location information of the random access information in the content structure information, wherein the random access information comprises a random access point, storing the content segment and the random access information, and selecting, if a random access request is received, a content sample corresponding to the random access point which is the most adjacent to a requested point to access using the random access information, wherein the content structure information comprises the location information of the content segments constituting the content and the location information of the random access information of the content segments, wherein the location information of the content segments and the location information of the random access information, each comprising a uniform resource locator (URL), are included independently in the content structure information.

2. The live content access method of claim 1, wherein the location information of the content segments and the random access information include location information of independent segment levels.

3. The live content access method of claim 1, wherein receiving content segments and random access information comprises storing the random access information of the content segments in sequence.

4. The live content access method of claim 3, wherein receiving content segments and random access information comprises generating a content file by attaching the sequentially stored random access information to a last content segment.

5. The live content access method of claim 1, wherein the location information of the content segments contain the location information of the random access information of the content segments.

6. A content provision server for providing a client with live contents to in a wireless communication system, comprising:
a wireless communication unit which transmits and receives signals and data over a radio link established with the client; and
a control unit which divides a content into a plurality of content segments, generates random access information of individual content segments, and controls to transmit the content segments and the random access information to the client in response to a request from the client based on location information of the content segments and location information of the random access information in content structure information,
wherein the random access information comprises a random access point, and
wherein the content structure information comprises the location information of the content segments constituting the content and the location information of the random access information of the content segments, and
wherein if a random access request is received by the client, the client selects a content sample corresponding to the random access point which is the most adjacent to a requested point to access using the random access information,
wherein the location information of the content segments and the location information of the random access information, each comprising a uniform resource locator (URL), are included independently in the content structure information.

7. A content transfer server for providing a client with live content structure information in a wireless communication system, comprising:
a wireless communication unit which transmits and receives signals and data over a radio link established with the client; and
a control unit which generates content structure information including location information of at least one content segment constituting a live content and location information of random access information of the at least one content segment, each comprising a uniform resource locator (URL), and transmits the content structure information in response to a request from the client,
wherein the random access information comprises a random access point, and
wherein the control unit generates the content structure information to have the location information of the at least one content segment and the location information of the random access information separately, and
wherein if a random access request is received by the client, the client selects a content sample corresponding to the random access point which is the most adjacent to a requested point to access using the random access information.

8. The content transfer server of claim 7, wherein the control unit generates the control structure information in which the location information of the at least one content segment contains the location information of the random access information of the at least one content segment.

9. A client for randomly accessing a content in a wireless communication system, comprising:
a wireless communication unit which transmits and receives signals and data over a radio link established with one of a content transfer server and a content provision server;
a control unit which receives content structure information on the content in response to a content play request, receives content segments and random access information of the content segments from the content provision server using location information of the content segments and location information of the random access information in the content structure information,
wherein the random access information comprises a random access point, and controls to select a content sample corresponding to the random access point which is the most adjacent to a requested point to access using the random access information in response to a random access request; and
a storage unit which stores the content segments and the random access information,
wherein the content structure information comprises the location information of the content segments constituting the content and location information of the random access information of the content segments,
wherein the location information of the content segments and the location information of the random access information of the content segments, each comprising a uniform resource locator (URL), are contained separately from each other in the content structure information.

10. The client of claim 9, wherein the location information of the content segments comprises the location information of the random access information of the content segments.

* * * * *